United States Patent
Wan et al.

(10) Patent No.: US 7,580,717 B2
(45) Date of Patent: Aug. 25, 2009

(54) METHOD AND APPARATUS FOR APPLICATIONS INCLUDING POSITION DETERMINATION

(75) Inventors: Wang Wan, Kanagawa-ken (JP); Shinya Takahashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 380 days.

(21) Appl. No.: 11/339,266

(22) Filed: Jan. 25, 2006

(65) Prior Publication Data

US 2007/0066321 A1  Mar. 22, 2007

(30) Foreign Application Priority Data

Sep. 21, 2005  (JP) ............... 2005-274492

(51) Int. Cl.
- H04W 24/00 (2006.01)
- H04M 3/42 (2006.01)
- H04M 1/00 (2006.01)
- G11B 5/00 (2006.01)
- H04N 7/00 (2006.01)
- H04N 5/44 (2006.01)

(52) U.S. Cl. ............... 455/456.2; 455/456.1; 455/414.2; 455/556.1; 455/556.2; 360/5; 348/143; 348/152; 348/725; 386/95

(58) Field of Classification Search ............... 455/456.1, 455/456.2, 556.1, 556.2; 360/5; 348/143, 348/152, 725; 386/95
See application file for complete search history.

(56) References Cited

U.S. PATENT DOCUMENTS

| 5,973,643 | A | * | 10/1999 | Hawkes et al. ............... 342/457 |
| 6,311,069 | B1 | * | 10/2001 | Havinis et al. ........... 455/456.4 |
| 2001/0029588 | A1 | * | 10/2001 | Nakamura et al. .......... 713/300 |
| 2001/0047470 | A1 | * | 11/2001 | Roche ........................ 712/244 |
| 2003/0054839 | A1 | * | 3/2003 | Ono ........................... 455/456 |
| 2005/0089183 | A1 | * | 4/2005 | Niederdrank et al. ....... 381/312 |
| 2006/0198607 | A1 | * | 9/2006 | Ju ............................... 386/95 |

FOREIGN PATENT DOCUMENTS

JP        2003-87846 A       3/2003

* cited by examiner

*Primary Examiner*—Vincent P Harper
*Assistant Examiner*—Ariel Balaoing
(74) *Attorney, Agent, or Firm*—Frishauf, Holtz, Goodman & Chick, P.C.

(57) ABSTRACT

To provide a method and apparatus for a plurality of applications including position determination, there is provided a radio communication device comprising a positioning member configured to determine a position of the radio communication device, an antenna, a receiver connected to the antenna, a controller connected to the receiver and the positioning member, configured to receive a demand for the position by way of the antenna and the receiver while running an application, and configured to stop the application and to have the positioning member determine the position in a case where the demand and the application are given a first rank and a second rank respectively and the first rank precedes the second rank.

21 Claims, 7 Drawing Sheets

| NOTIFICATION TYPE | PROCESS THAT IS GOING ON |
|---|---|
| | UMTS VOICE OR DATA CALL |
| 1ST | SIMULTANEOUS |
| 2ND | SIMULTANEOUS |
| 3RD | SIMULTANEOUS |
| 4TH | SIMULTANEOUS |

FIG. 8

| NOTIFICATION TYPE | PROCESS THAT IS GOING ON |
|---|---|
| | GSM VOICE CALL |
| 1ST | POSITION DETERMINATION PRECEDES |
| 2ND | VOICE CALL PRECEDES |
| 3RD | VOICE CALL PRECEDES |
| 4TH | VOICE CALL PRECEDES |

FIG. 9

| NOTIFICATION TYPE | PROCESS THAT IS GOING ON |
|---|---|
| | GSM DATA CALL |
| 1ST | POSITION DETERMINATION PRECEDES |
| 2ND | POSITION DETERMINATION PRECEDES |
| 3RD | POSITION DETERMINATION PRECEDES |
| 4TH | DATA CALL PRECEDES |

FIG. 10

| NOTIFICATION TYPE | PROCESS THAT IS GOING ON |
|---|---|
| | VIDEO RECORDING |
| 1ST | SIMULTANEOUS |
| 2ND | SIMULTANEOUS |
| 3RD | POSITION DETERMINATION PRECEDES |
| 4TH | VIDEO RECORDING PRECEDES |

FIG. 11

METHOD AND APPARATUS FOR APPLICATIONS INCLUDING POSITION DETERMINATION

CROSS REFERENCE TO RELATED APPLICATIONS

This application is based upon and claims the benefit of priority from the prior Japanese Patent Application No. 2005-274492 filed on Sep. 21, 2005; the entire contents of which are incorporated herein by reference.

1. Field of the Invention

The present invention relates to a method and apparatus for applications including position determination and in particular to those for a radio communication device.

2. Description of the Background

There is known a radio communication device equipped with a positioning system for determining its position (position determination) and a receiver for receiving a demand for the position from a positioning server. The radio communication device determines the position according to the demand, and sends a result of the position determination to the positioning server.

The positioning system is, e.g., a GPS (Global Positioning System) receiver for receiving radio signals sent from GPS satellites, for measuring a distance to each GPS satellite and for determining its position. The radio communication device may be provided by the positioning server with a set of information regarding an orbit of each GPS satellite, etc., to reduce a processing load and to ease position determination.

The radio communication device is, if it belongs to a mobile network of so called the second generation like GSM (Global System for Mobile Communications), unable to simultaneously communicate with the positioning server by TCP/IP while having a voice or data call through the mobile network.

There is known a method applicable to such a case, which is for receiving a demand for the position while having a voice call and for determining the position after canceling the voice call. This conventional method is disclosed in Japanese Patent Publication (Kokai), No. 2003-87846.

There is known another method comprising, receiving a demand for a position, presenting a message on a display or producing an audible alert to draw attention to the reception of the demand, and for inviting an operation either to accept or to refuse the demand.

The firstly mentioned method may cause a problem that a talk having been going on is interrupted by canceling the voice call.

The secondly mentioned method may cause a problem that the message shown on the display or the audible alert is annoying while recording a video (with a sound) using the radio communication device.

SUMMARY OF THE INVENTION

Accordingly, an advantage of the present invention is to provide a method and apparatus for a plurality of applications including position determination.

To achieve the above advantage, one aspect of the present invention is to provide a method for a plurality of applications including position determination of a radio communication device comprising receiving a demand for a position of the radio communication device while running an application, the demand and the application being given a first rank and a second rank respectively, stopping the application in a case where the first rank precedes the second rank, and determining the position after stopping the application.

Another aspect of the present invention is to provide a radio communication device comprising a positioning member configured to determine a position of the radio communication device, an antenna, a receiver connected to the antenna, a controller connected to the receiver and the positioning member, configured to receive a demand for the position by way of the antenna and the receiver while running an application, and configured to stop the application and to have the positioning member determine the position in a case where the demand and the application are given a first rank and a second rank respectively and the first rank precedes the second rank.

BRIEF DESCRIPTION OF THE DRAWINGS

FIG. 3 is a flow chart of the embodiment in a case where no GSM voice or data call is going on.

FIG. 5 is a flow chart of the embodiment in a case where a GSM voice call is going on.

FIG. 6 is a flow chart of the embodiment in a case where a GSM data call is going on.

DETAILED DESCRIPTION OF THE INVENTION

Figure 1:
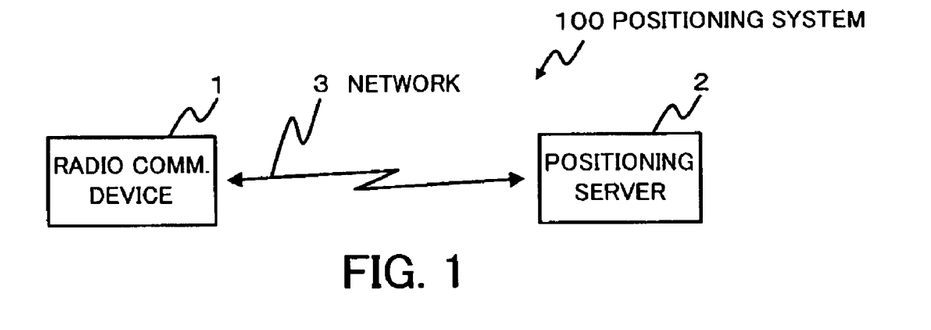
FIG. 1 is a block diagram of a positioning system of an embodiment of the present invention.

An embodiment of the present invention will be described with reference to FIGS. 1-11. FIG. 1 is a block diagram of a positioning system including a radio communication device of the embodiment. The positioning system 100 comprises a radio communication device 1 and a positioning server 2 connectable to each other by way of a network 3 including a mobile network to which the radio communication device 1 belongs.

Figure 2:
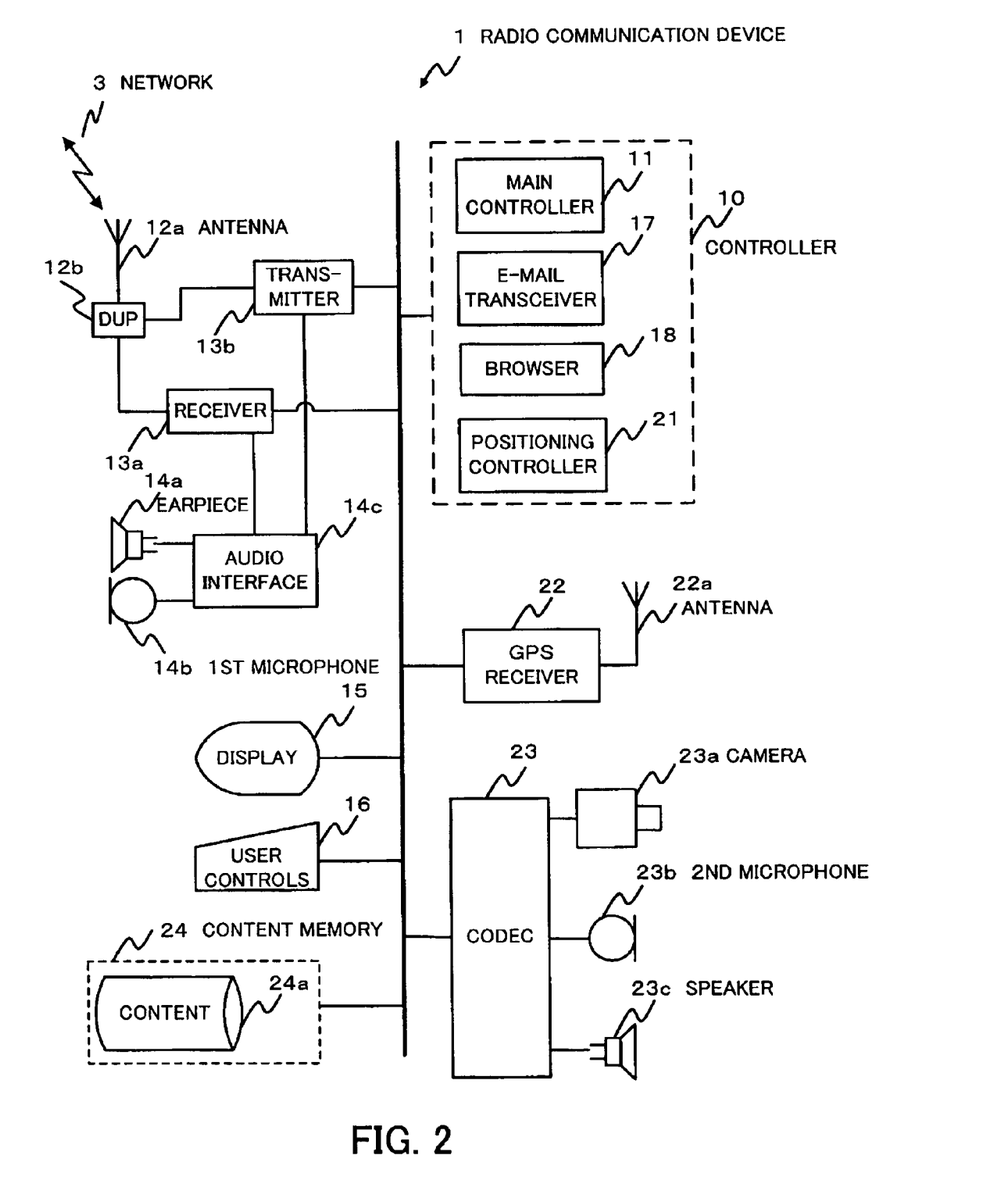
FIG. 2 is a block diagram of a radio communication device of the embodiment.

FIG. 2 is a block diagram of the radio communication device 1 including a controller 10 formed by, e.g., a microprocessor and programmed to perform several functions. They are shown by four functional blocks included in the controller 10, and a first block is a main controller 11 usable for monitoring and controlling each part of, and all over, the radio communication device 1.

The radio communication device 1 has an antenna 12a connected to a receiver 13a and a transmitter 13b via a duplexer 12b. The receiver 13a is configured to receive an incoming radio signal through the antenna 12a and the duplexer 12b, including amplification, down-conversion, demodulation and decoding in order to obtain a set of incoming information.

The transmitter 13b is configured to generate an outgoing radio signal that carries a set of outgoing information by encoding, modulation, up-conversion and amplification. The outgoing radio signal is radiated into the air through the duplexer 12b and the antenna 12a.

The radio communication device 1 has an earpiece 14a connected to the receiver 13a via an audio interface 14c. The radio communication device 1 has a first microphone 14b connected, via the audio interface 14c, to the transmitter 13b via an audio interface 14c. The earpiece 14a and the first speaker 14b are usable for voice communications by way of the network 3.

The audio interface 14c is configured to convert an analog voice signal from the first microphone 14b to an outgoing digital voice signal, and to convert an incoming digital voice signal to an analog voice signal to drive the earpiece 14a.

The radio communication device 1 has a display 15 formed by, e.g., a liquid crystal device and configured to present text, pictures or videos. The radio communication device 1 has a set of user controls 16 (hereinafter called as user controls 16) formed by, e.g., a plurality of keys for user control operations.

A second functional block of the controller 10 is an e-mail transceiver 17 usable for sending and receiving e-mails. A third functional block of the controller 10 is a browser 18 usable for browsing web-sites accessible through the network 3.

The radio communication device 1 has a GPS receiver 22 and a GPS antenna 22a configured to receive radio signals sent from a plurality of GPS satellites, to measure a distance to each GPS satellite and to determine a position of the GPS antenna 22a. A fourth functional block of the controller 10 is a positioning controller 21 for controlling the GPS receiver 22.

The radio communication device 1 has a codec 23, a camera 23a, a second microphone 23b and a speaker 23c, configured to record and play multimedia content. The radio communication device 1 has a content memory 24 configured to store a set of content 24a including a video and a sound.

The receiver 13a amplifies and down-converts an incoming radio signal that has been received through the antenna 12a and the duplexer 12b. The receiver 13a then demodulates the received radio signal to provide the audio interface 14c with an incoming digital voice signal and to provide the controller 10 with an incoming digital data signal.

The transmitter 13b modulates an intermediate frequency signal with an outgoing digital voice signal coming out of the audio interface 14c and with an outgoing digital data signal coming out of the controller 10. The transmitter 13b then up-converts and amplifies the modulated signal to produce an outgoing radio signal that is radiated into the air through the duplexer 12b and the antenna 12a.

The receiver 13a is configured to be interchangeably compatible with the GSM standard and the UMTS (Universal Mobile Telecommunications System) standard being controlled by the main controller 11, and so is the transmitter 13b.

The audio interface 14c obtains an incoming digital voice signal received by the receiver 13a, and provides the earpiece 14a with an amplified incoming analog voice signal converted from the obtained digital voice signal. The audio interface 14c amplifies an outgoing analog voice signal picked up by the first microphone 14b, and provides the transmitter 13b with an outgoing digital voice signal converted from the amplified analog voice signal.

The main controller 11 presents on the display 15 a plurality of image data and a plurality of text data including letters, numerals and a cursor. The presented data may be changed under control of the main controller 11 according to an operation done on the user controls 16 or an incoming digital data signal received by the receiver 13a.

The user controls 16 includes a plurality of numeric keys, each of which toggles a numeral and several letters, and a plurality of functional keys including a navigation key usable for moving the cursor up, down, left or right. After a key of the user controls 16 is pressed, a signal identifying the pressed key is sent to the main controller 11.

In a case where one of the numeric keys is pressed in a toggling manner, the main controller 11 presents an entered numeral or letter on the display 15. In a case where one of the functional keys is pressed, the main controller 11 performs a function corresponding to the pressed functional key.

The e-mail transceiver 17 starts working under control of the main controller 11 after a starting operation of handling e-mails is done on the user controls 16. The e-mail transceiver 17 arranges an outgoing e-mail including an e-mail address of an addressee, a title and a message, each of which is formed by a plurality of numerals and letters entered on the user controls 16.

The e-mail transceiver 17 provides the transmitter 13a with the outgoing e-mail to be sent, under control of the main controller 11 and by way of the duplexer 12b, the antenna 12a and a base station (not shown) of the network 3, to an e-mail server (not shown) of the network 3.

The e-mail transceiver 17 receives an incoming e-mail sent from the e-mail server by way of the base station, the antenna 12a, the duplexer 12b and the receiver 13a, under control of the main controller 11. The e-mail transceiver 17 stores the received e-mail in a built-in memory (not shown).

The e-mail transceiver 17 provides the main controller 11 with a list of received e-mails stored in the built-in memory so that the list is shown on the display 15, according to an operation for listing the stored e-mails done on the user controls 16.

The e-mail transceiver 17 selects one of the stored e-mails and provides the main controller 11 with the selected e-mail so that the selected e-mail is shown on the display 15, according to an operation for selecting and reading one of the stored e-mails done on the user controls 16.

The browser 18 starts working under control of the main controller 11 after a starting operation of web-browsing is done on the user controls 16. The browser 18 presents a message on the display 15 inviting an address of a web site (not shown) to be entered through the user controls 16, and provides the transmitter 13b with a signal accessing the web site of the entered address.

The signal is sent to the web site by way of the duplexer 12b, the antenna 12a and a base station (not shown) of the network 3, under control of the main controller 11. The browser 18 is connected to the web site after the signal successfully reaches the web site.

The browser 18 receives a set of information obtained from the web site by way of the base station, the antenna 12a, the duplexer 12b and the receiver 13a, under control of the main controller 11. The browser 18 presents the obtained set of information on the display 15.

The positioning controller 21 receives a set of information for assisting position determination, e.g., an identifier or an orbit of each GPS satellite in a line of sight from the GPS antenna 22a, and a demand for a position of the radio communication device 1 from the positioning server 2 by way of the base station, the antenna 12a, the duplexer 12b and the receiver 13a. Each demand is given one of a plurality of ranks. The positioning controller 11 starts controlling the GPS receiver 22 after receiving the demand.

The main controller 11 monitors and controls each part of the radio communication device 1, and runs an application, e.g., having a voice or data call through the network 3, playing audio or video content, or video recording. Each application is given one of the ranks. The positioning controller 21 decides to work the GPS receiver or not by comparing the ranks of the received demand and the application in coordination with the main controller 11.

After deciding to work the GPS receiver, the positioning controller 21 provides the GPS receiver 22 with the information received from the positioning server 2, and has the GPS receiver 22 receive a radio signal radiated from each GPS satellite in the line of sight by way of the GPS antenna 22a and determine the position based on the orbit of the satellite and the time of receiving the radio signal.

The codec 23 starts working under control of the main controller 11 after a starting operation of video recording is done on the user controls 16. The codec 23 produces a picture frame signal formed by a series of static pictures taken by the camera 23a. The codec 23 produces a sound frame signal formed by a series of time frame sounds picked up by the second microphone 23b.

The codec 23 encodes the picture frame signal and the sound frame signal respectively for compression. The codec 23 produces the set of content 24a by duplexing the encoded picture frame signal and the encoded sound frame signal, and stores the produced set of content 24a on the content memory 24.

The codec 23 provides the display 15 with the picture frame signal and provides the speaker 23c with the sound frame signal while encoding these signals for monitoring the recorded video and sound. The above signals for monitoring may be produced by decoding the encoded picture frame signal and the encoded sound frame signal.

The codec 23 starts working under control of the main controller 11 after a starting operation of video playing is done on the user controls 16. The codec 23 reads a piece of video content out of the content memory 24 and separates into an encoded picture frame signal and an encoded sound frame signal. The codec 23 decodes the encoded video frame signal and the encoded sound frame signal. The codec 23 provides the display 15 with the decoded video frame signal so that the decoded video may be viewed. The codec 23 provides the speaker 23c with the decoded sound frame signal so that the decoded sound may be listened to.

Assume that each demand for a position of the radio communication device 1 sent from the positioning server 2 is given one of four ranks. Each rank corresponds to, e.g., a notification type of "IP-Based Location Services" defined in the Third Generation Partnership Project 2 (3GPP2), where a demand given each notification type is handled, in principle, as follows.

A demand given a first notification type named "privacy override" is of a highest rank, and is used in a case of an emergency, e.g., an emergency call request. Suppose that the radio communication device 1 receives a demand for a position of the radio communication device 1 while running an application that would disturb position determination, and that the demand is given the first notification type. In such a case, the radio communication device 1 stops the application and determines the position.

A demand given a second notification type named "no notification, no verification" is of a second highest rank, and is used in a case where, e.g., the radio communication device 1 is for a business use and the demand is originally issued by a manager of the business. In such a case, the radio communication device 1 determines the position without presenting the reception of the demand.

A demand given a third notification type named "notification only" is of a third highest rank, and is used in a case, e.g., where the radio communication device 1 is for a business use and the demand is originally issued by a manager of the business. In such a case, the radio communication device 1 determines the position after presenting the reception of the demand.

A demand given a fourth notification type named "notification and verification" is of a fourth highest rank, and is used in a case, e.g., where the demand is originally issued by someone related or unrelated to a use of the radio communication device 1. In such a case, the radio communication device 1 determines the position after presenting the reception of the demand, and after the demand is accepted.

Figure 3:
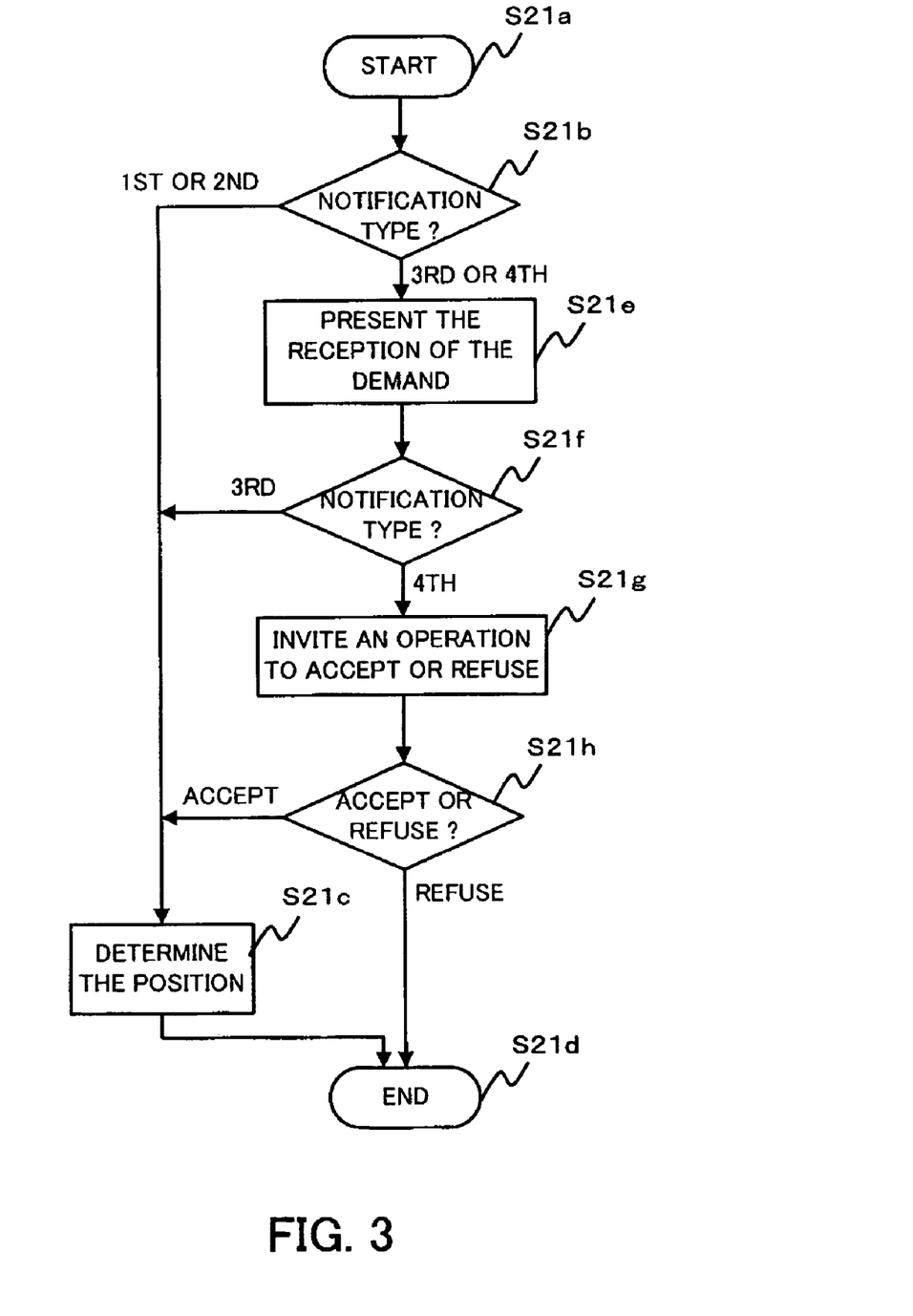

A method for the radio communication device 1 of the present invention will be described in detail with reference to FIGS. 3-11. FIG. 3 is a flow chart of a process of the method in a first case where at most a UMTS voice or data call is going on (i.e., there is no GSM call going on).

In FIG. 3, the positioning controller 21 starts the process under control of the main controller 11 (step "S21a"). After a demand for the position of the radio communication device 1 is received, the positioning controller 21 finds out which is a notification type of the demand sent from the positioning server 2 (step "S21b").

In a case where the demand is given the first notification type (privacy override) or the second notification type (no notification, no verification), the positioning controller 21 has the GPS receiver 22 start working and determine the position (step "S21c"), and then ends the process (step "S21d").

In a case where the demand is given either the third notification type (notification only) or the fourth notification type (notification and verification) on the step "S21b", the positioning controller 21 presents the reception of the demand on the display 15 or by an audible alert from the speaker 23c (possibly simultaneously) to draw attention to the reception for a certain period of time (notification, step "S21e").

The positioning controller 21 finds out which is a notification type of the demand (step "S21f"). In a case where the demand is given the third notification type (notification only), the positioning controller 21 has the GPS receiver 22 start working and determine the position (step "S21c"), and then ends the process (step "S21d").

In a case where the demand is given the fourth notification type (notification and verification) on the step "S21f", the positioning controller 21 presents a message on the display 15 inviting an operation on the user controls 16 to accept or refuse the demand (step "S21g"). The positioning controller 21 may, possibly simultaneously, produce a sound inviting the operation through the speaker 23c.

After the operation to accept or refuse the demand is done on the user controls 16, the positioning controller 21 knows if the demand is accepted or refused by a signal identifying the pressed key sent to the main controller 11 (verification, step "S21h"). In a case where the demand is accepted, the positioning controller 21 has the GPS receiver 22 start working and determine the position (step "S21c"), and then ends the process (step "S21d").

Figure 4:
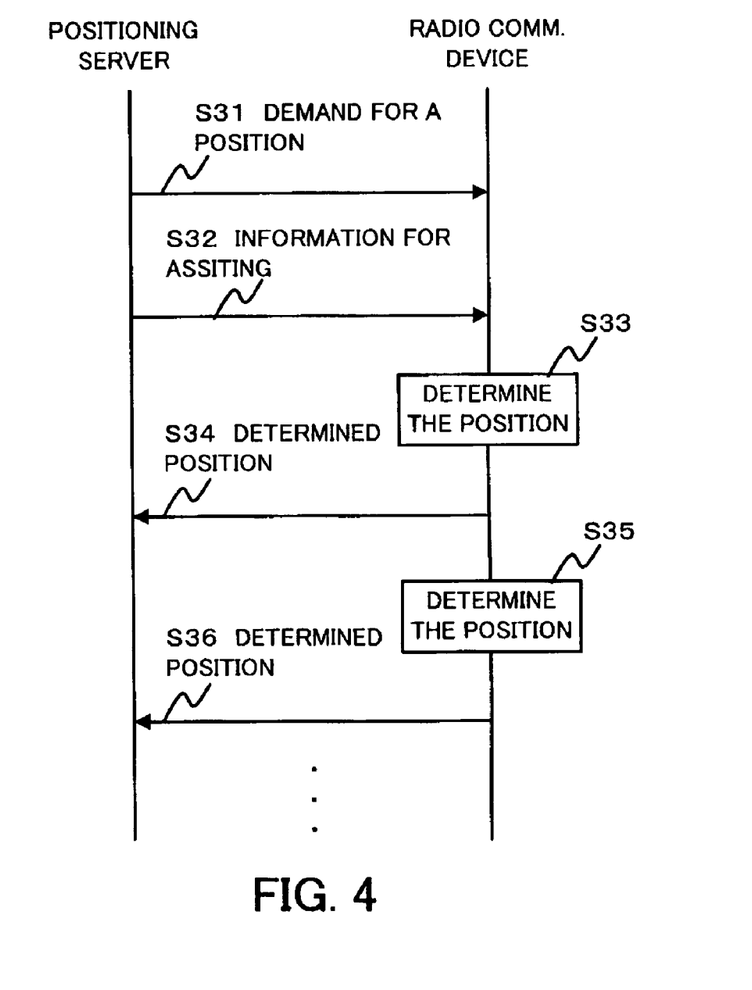
FIG. 4 is a chart of a sequential exchange of information between the radio communication device and a positioning server of the embodiment.

FIG. 4 is a chart illustrating a sequential exchange of information between the radio communication device 1 and the positioning server 2. The positioning server 2 sends a demand for a position of the radio communication device 1 (step "S31"). After receiving the demand, the positioning controller 21 starts working and receives a set of information for assisting position determination, e.g., an identifier or an orbit of each GPS satellite in a line of sight from the radio communication device 1 (step "S32").

The positioning controller 21 has the GPS receiver 22 determine the position being assisted by the information received above (step "S33"). The positioning controller 21 sends a result of the position determination to the positioning server 2 (step "S34"). In a case where the radio communication device 1 is required to repeat position determination a given number of times according to the demand, the positioning controller 21 has the GPS receiver 22 determine the position (step "S35") the given number of times repeatedly, and sends a result of the position determination to the positioning server 2 (step "S36") each time.

Figure 5:
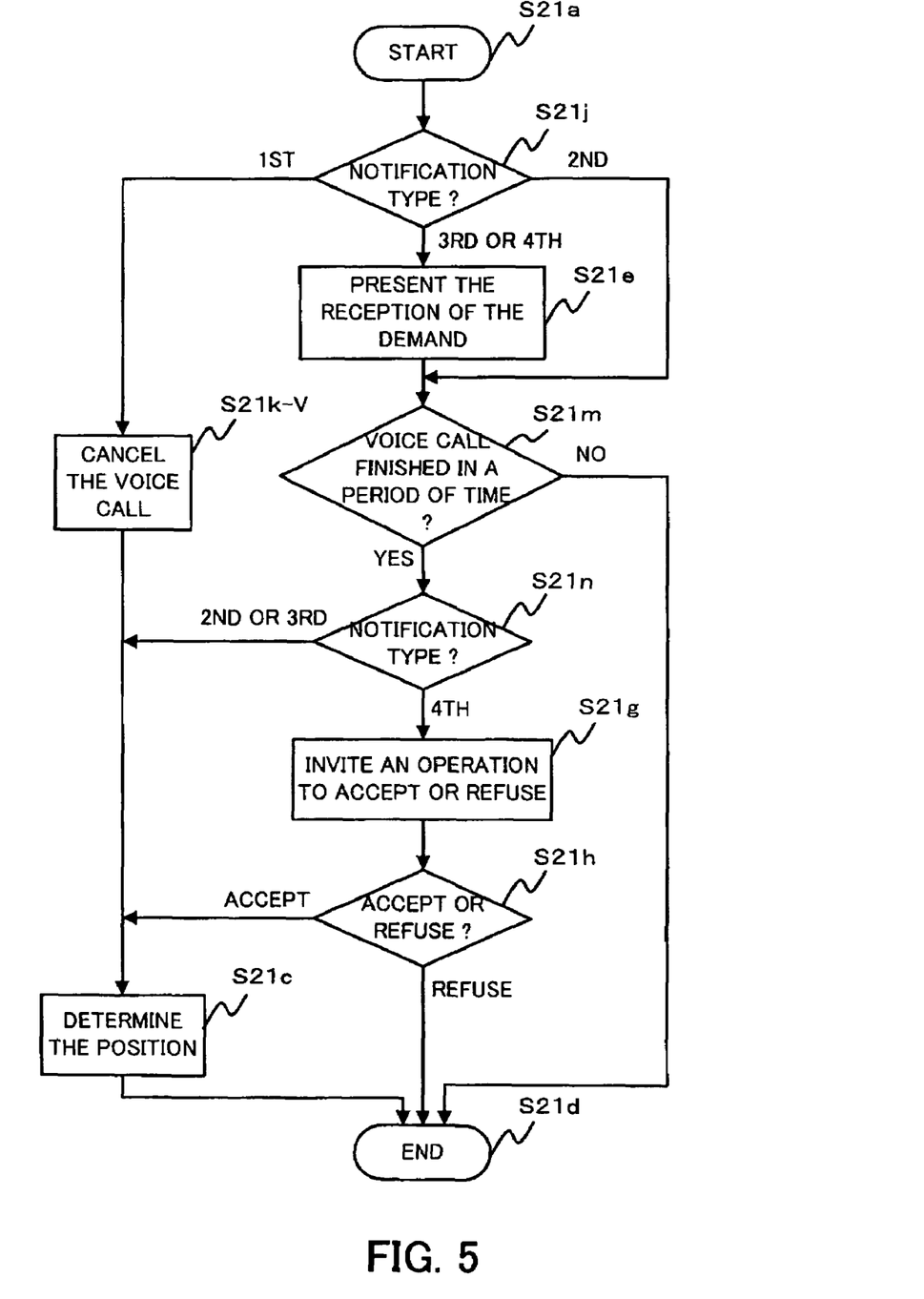

FIG. 5 is a flow chart of a process of the method in a second case where a GSM voice call is going on. The flow chart in FIG. 5 includes a plurality of steps each of which is a same as the corresponding one given the same reference numeral in FIG. 3, and their explanations are omitted.

After starting the process (step "S21a"), the positioning controller 21 finds out which is a notification type of a demand sent from the positioning server 2 (step "S21f"). In a case where the demand is given the first notification type, the positioning controller 21 asks the main controller 11 to cancel the voice call (step "S21k-V"), and moves on to the steps "S21c" and "S21d".

In a case where the demand is given either the third or the fourth notification type, the positioning controller 21 presents the reception of the demand (step "S21e"). The positioning controller 21 finds out if the voice call is finished so soon that a result of the position determination may be received by the positioning server 2 within a given period of time after the positioning server 2 sends the demand (step "S21m").

In a case where the voice call is finished so soon that the condition of the step "S21m" is satisfied ("YES" of the step "S21m"), the positioning controller 21 finds out which is a notification type of the demand (step "S21n"). In a case where the demand is given the second or the third notification type, the positioning controller 21 moves on to the steps "S21c" and "S21d". In a case where the demand is given the fourth notification type, the positioning controller 21 invites an operation to accept or refuse the demand (step "S21g") and moves on to the step "S21h" and the following steps.

In a case where the voice call is not finished so soon ("NO" of the step "S21m"), the positioning controller 21 ends the process (step "S21d"). In a case where the demand is given the second notification type on the step "S21f", the positioning controller 21 moves on to the step "S21m" and the following steps.

Figure 6:
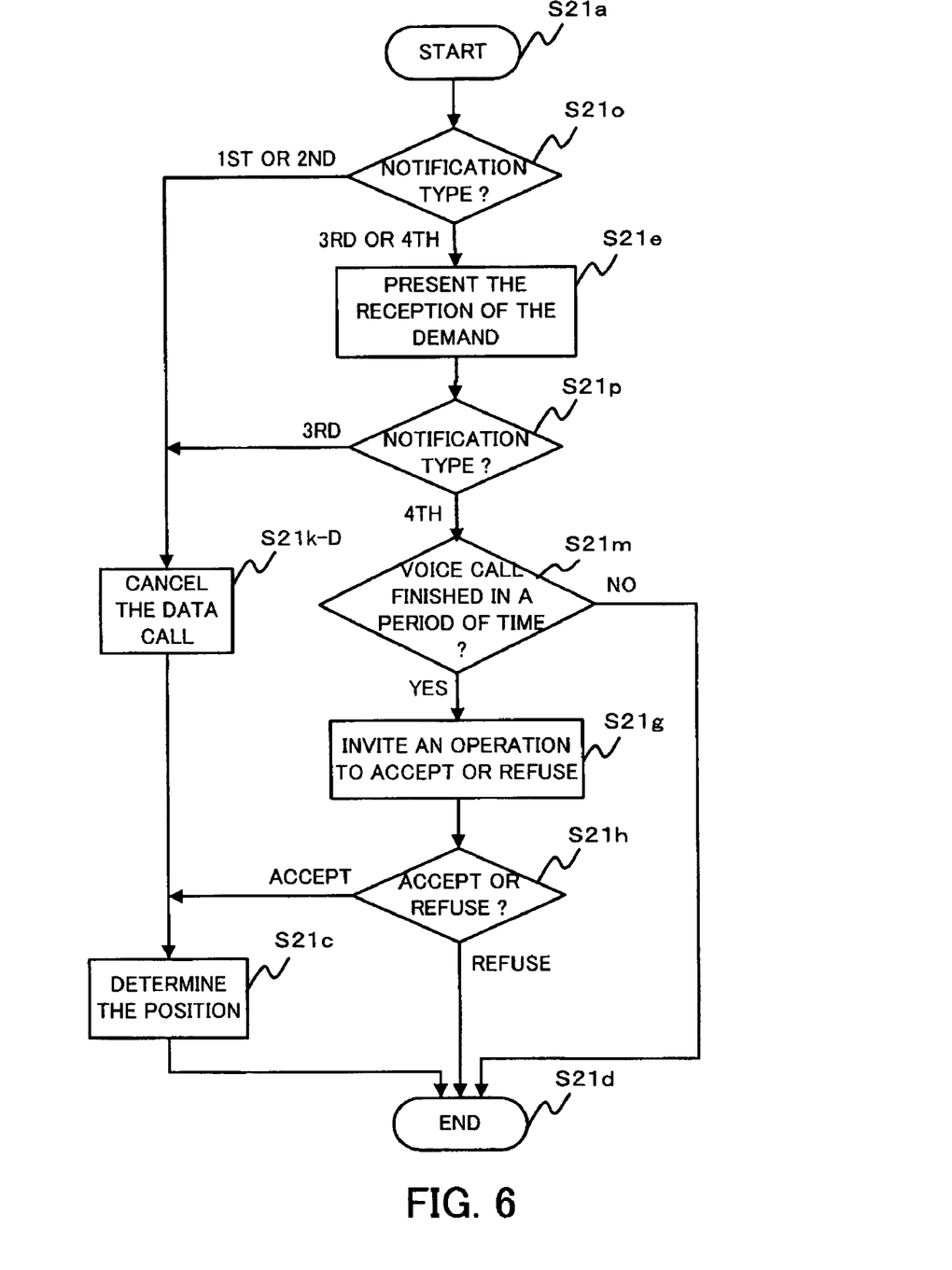

FIG. 6 is a flow chart of a process of the method in a third case where a GSM data call is going on. The flow chart in FIG. 6 includes a plurality of steps each of which is a same as the corresponding one given the same reference numeral in FIG. 5, and their explanations are omitted.

After starting the process (step "S21a"), the positioning controller 21 finds out which is a notification type of a demand sent from the positioning server 2 (step "S21o"). In a case where the demand is given the first or the second notification type, the positioning server 21 asks the main controller 11 to cancel the data call (step "S21k-D"), and moves on to the steps "S21c" and "S21d".

In a case where the demand is given the third or the fourth notification type, the positioning controller 21 presents the reception of the demand (step "S21e"), and finds out which is a notification type of the demand (step "S21p"). In a case where the demand is given the third notification type, the positioning controller 21 moves on to the step "S21k-D" and the following steps. In a case where the demand is given the fourth notification type, the positioning controller 21 moves on to the step "S21m" and the following steps. No branching step like the step "S21n" in FIG. 5 follows the step "S21m".

Figure 7:
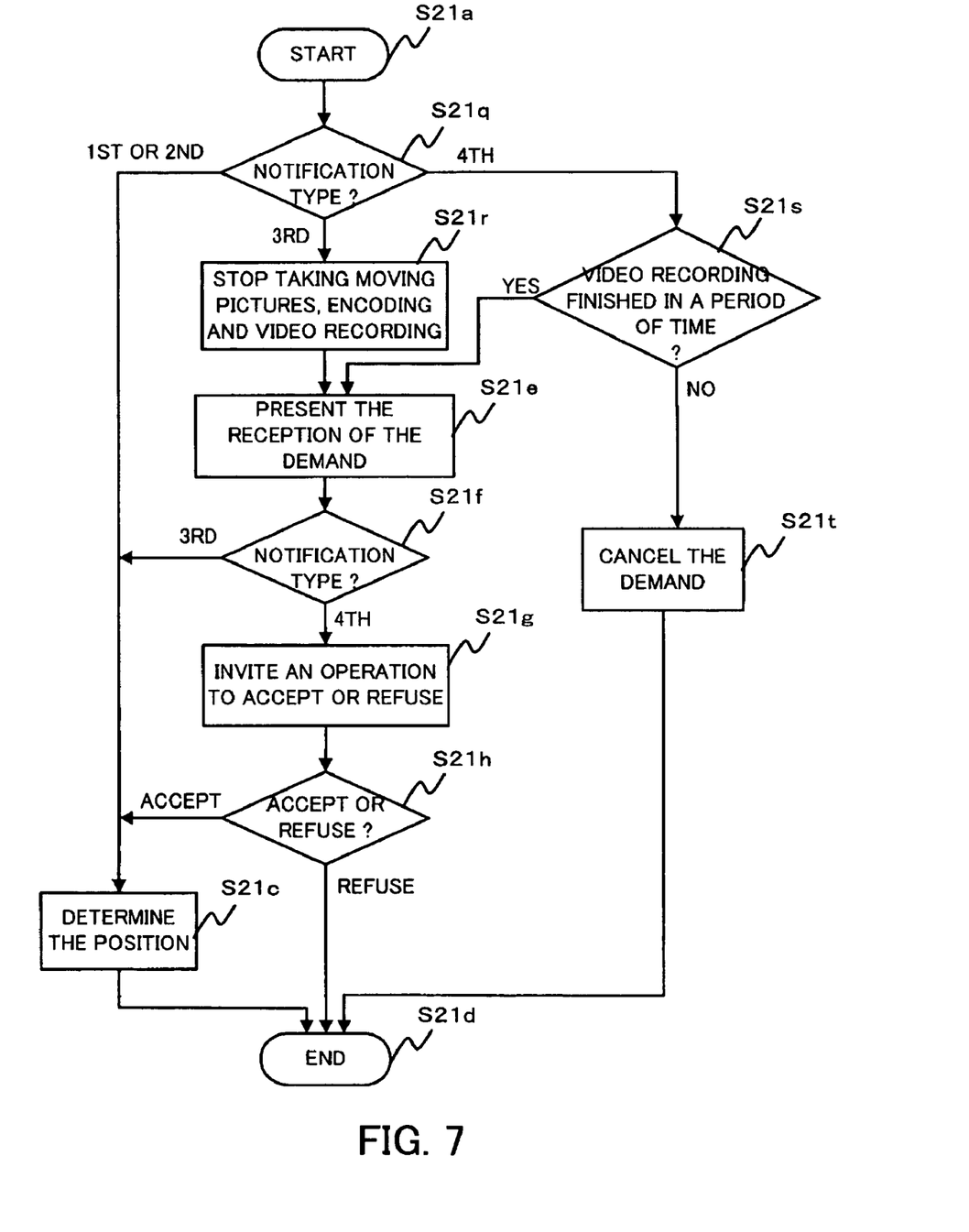
FIG. 7 is a flow chart of the embodiment in a case where a video is being recorded.

FIG. 7 is a flow chart of a process of the method in a fourth case where a series of moving pictures is being taken by the camera 23a, encoded by the codec 23 and recorded as a video on the content memory 24. The flow chart in FIG. 7 includes a plurality of steps each of which is a same as the corresponding one given the same reference numeral in FIG. 3, and their explanations are omitted.

After starting the process (step "S21a"), the positioning controller 21 finds out which is a notification type of a demand sent from the positioning server 2 (step "S21q"). In a case where the demand is given the first or the second notification type, the positioning controller 21 moves on to the steps "S21c" and "S21d". In a case where the demand is given the third notification type, the positioning controller 21 has the camera 23a stop taking a series of moving pictures, and the codec 23 stop encoding the moving pictures and recording a video formed by the encoded moving pictures on the content memory 24. The positioning controller 21 then moves on to the step "S21e" and the following steps.

The above process formed by taking and encoding moving pictures to form a video and recording the video on the content memory 24 is hereinafter called a process of video recording.

In a case where the demand is given the fourth notification type, the positioning controller 21 finds out if the process of video recording is finished so soon that the determined position may be accepted by the positioning server 2 that defines a limited time duration from sending the demand (step "S21s").

In a case where the process of video recording is finished so soon that the condition of the step "S21s" is satisfied ("YES" of the step "S21s"), the positioning controller 21 moves on to the step "S21e" and the following steps. In a case where the process of video recording is not finished so soon ("NO" of the step "S21s"), the positioning controller 21 cancels the demand (step "S21t") and ends the process (step "S21d").

Figure 8:
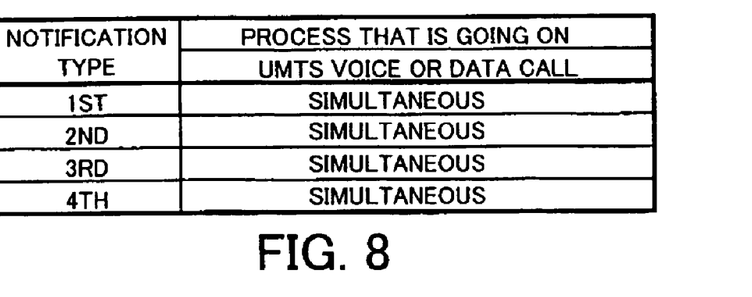
FIG. 8 shows a table of the embodiment illustrating precedence between position determination and a UMTS voice or data call.

A table in FIG. 8 shows if a demand for a position of each notification type precedes a UMTS voice or data call. The precedence shown on the table in FIG. 8 (and also in FIGS. 9-11) may be included in a program of the positioning controller 21, or may be stored in a built-in memory (not shown in FIG. 2). The table in FIG. 8 corresponds to the first case earlier described where a UMTS voice or data call is going on.

As shown in FIG. 8, the demand for a position of any notification type may be processed simultaneously with a UMTS voice or data call. The position may be determined as if there were no UMTS voice or data call that is going on.

Figure 9:
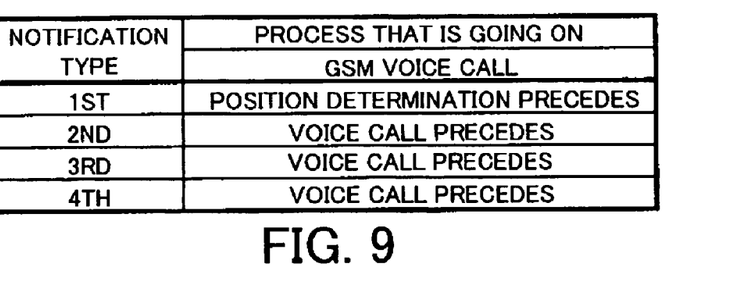
FIG. 9 shows a table of the embodiment illustrating precedence between position determination and a GSM voice call.

A table in FIG. 9 shows if a demand for a position of each notification type precedes a GSM voice call. The table in FIG. 9 corresponds to the second case earlier described where a GSM voice call is going on. After receiving a demand of the first notification type, the positioning controller 21 has the GSM voice call cancelled and has the GPS receiver 22 determine the position, according to an entry of a row of the first notification type of the table in FIG. 9. After receiving a demand of the second, third or fourth notification type, the positioning controller 21 has the GSM voice call continue without having the GPS receiver 22 determine the position, according to an entry of a row of the second, third or fourth notification type of the table in FIG. 9.

As shown in FIG. 9, a demand of the first notification type only precedes a GSM voice call, as voice calls should not be interrupted as far as possible in general and particularly for a business use.

Figure 10:
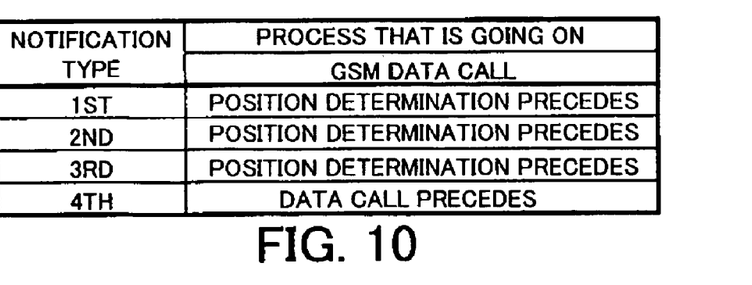
FIG. 10 shows a table of the embodiment illustrating precedence between position determination and a GSM data call.

A table in FIG. 10 shows if a demand for a position of each notification type precedes a GSM data call. The table in FIG. 10 corresponds to the third case earlier described where a GSM data call is going on. After receiving a demand of the first, second or third notification type, the positioning controller 21 has the GSM data call cancelled and has the GPS receiver 22 determine the position, according to an entry of a row of the first, second or third notification type of the table in FIG. 10. After receiving a demand of the fourth notification type, the positioning controller 21 has the GSM data call continue without having the GPS receiver 22 determine the position, according to an entry of a row of the fourth notification type of the table in FIG. 10.

As shown in FIG. 10, a GSM data call precedes only a demand of the fourth notification type, as data calls often may be deferred even for a business use.

Figure 11:
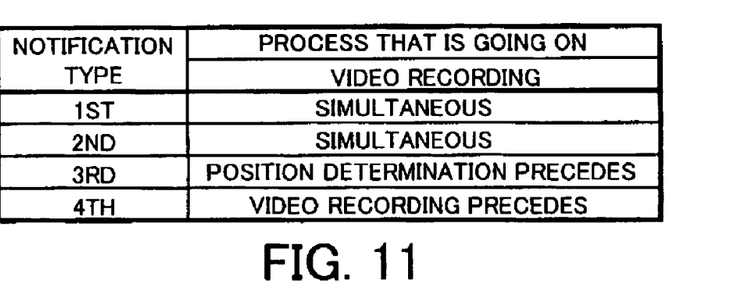
FIG. 11 shows a table of the embodiment illustrating precedence between position determination and video recording.

A table in FIG. 11 shows if a demand for a position of each notification type precedes a process of video recording. The table in FIG. 11 corresponds to the fourth case earlier described where the process of video recording is going on.

As shown in FIG. 11, a demand of the first or the second notification type for the position is processed simultaneously with the process of video recording. After receiving such a demand, the positioning controller 21 has the GPS receiver 22 determine the position while the process of video recording continues, as the reception of the demand is presented neither on the display 15 nor by an audible alert from the speaker 23c.

After receiving a demand of the third notification type, the positioning controller 21 has the process of video recording stopped and has the GPS receiver 22 determine the position, as that demand particularly for a business use should be given priority. After receiving a demand of the fourth notification type, the positioning controller 21 has the process of video recording continue without having the GPS receiver 22 determine the position.

In a case where the position controller 21 receives a demand for a position while a GSM voice or data call is going on and an operation is done to cancel the call, the positioning controller 21 has the GPS receiver 22 determine the position although being supposed not to without such an operation.

In a case where the positioning controller 21 gives priority to a GSM voice or data call or a process of video recording and finishes that in a given period of time after receiving a demand for a position, the positioning controller 21 has the GPS receiver 22 determine the position. The positioning controller 21 may present the reception of a demand for the position of the first notification type, although being supposed not to as shown in FIGS. 3 and 5-7.

The positioning controller 21 may invite an operation to choose to determine the position or not after receiving a demand of any of the notification types. After an operation to determine the position is done for any of the notification types, the positioning controller 21 may follow the flow after receiving a demand as shown in one of FIGS. 3 and 5-7. After an operation not to determine the position is done for the first notification type, the positioning controller 21 may follow the flow after receiving a demand of the first notification type as shown in one of FIGS. 3 and 5-7.

After an operation not to determine the position is done for one of the second, third and fourth notification type, the positioning controller 21 may have the GPS receiver not to work. After an operation not to determine the position is done for one of the second, third and fourth notification type, the positioning controller 21 may follow the flow after receiving a demand of the fourth notification type as shown in one of FIGS. 3 and 5-7.

In the above description, it is implicitly assumed that a UMTS voice or data call is going on between the radio communication device 1 and, e.g., another UMTS mobile phone. In the above description, it is implicitly assumed that a GSM voice or data call is going on between the radio communication device 1 and, e.g., another GSM mobile phone. The radio communication device 1, however, may roam between a UMTS network and a GSM network. In such a case, the positioning controller 21 follows the above procedures in one of those networks after roaming.

In the above description, it is assumed that either a UMTS call or a GSM call is going on, and that an order of handling the GSM call and position determination is arranged by the present invention as they are unable to be simultaneously processed. The present invention, however, may be applied to arranging an order of position determination and any application unable to be simultaneously processed.

The particular hardware or software implementation of the present invention may be varied while still remaining within the scope of the present invention. It is therefore to be understood that within the scope of the appended claims and their equivalents, the invention may be practiced otherwise than as specifically described herein.

What is claimed is:

1. A method for managing a plurality of applications of a radio communication device, wherein the applications include a position determination application, a voice call application, and a data call application, said method comprising:

receiving a demand for a position of the radio communication device while running the voice or data call application, wherein the demand is given a rank and the voice or data call application is given another rank; and stopping the voice call application or data call application and running the position determination application to determine the position after stopping the voice or data call application, when the rank of the demand is higher than the rank of the voice or data call application;

wherein the radio communication device is adapted to receive a plurality of types of demands for the position of the radio communication device;

wherein the plurality of types of demands comprise a privacy-override-type demand which is given the highest rank, a no-verification-type demand which does not provide a user with an opportunity to reject the demand and which is given the second-highest rank, and a verification-type demand which provides the user with an opportunity to reject the demand; and wherein a GSM data call application of the radio communication device is given a rank which is higher than the rank of the verification-type demand, and which is lower than the ranks of the privacy-override-type demand and the no-verification-type demand.

2. The method of claim 1, further comprising:

continuing the voice or data call application and determining the position in a case where the rank of the demand equals the rank of the voice or data call application.

3. The method of claim 1, further comprising determining the position upon finishing the voice call application within a given period of time after the reception of the demand in a case where the rank of the voice call application is higher than the rank of the demand.

4. The method of claim 1, wherein the radio communication device has a video recording application which comprises taking and encoding a series of moving pictures to form a video and recording the video.

5. The method of claim 1, further comprising processing the demand for the position of the radio communication device and the voice or data call application simultaneously if the voice or data call application is a UMTS voice or data call application.

6. The method of claim 1, wherein a GSM voice call application of the radio communication device is given a rank which is lower than the rank of the privacy-override-type demand.

7. The method of claim 6, wherein the rank of the GSM voice call application is higher than the ranks of the no-verification-type demand and the verification-type demand.

8. A method for managing a plurality of applications of a radio communication device, wherein the applications include a position determination application and a video recording application which comprises taking and encoding a series of moving pictures to form a video and recording the video, said method comprising:
receiving a demand for a position of the radio communication device while running the video recording application, wherein the demand is given a rank and the video recording application is given another rank;
presenting the reception of the demand and determining the position upon finishing recording the video in a case where the rank of the demand is lower than the rank of the video recording application and it is determined that the recording of the video will be finished within a given period of time after the reception of the demand; and
canceling the demand in a case where the rank of the demand is lower than the rank of the video recording application and it is determined that the recording of the video will not be finished within the given period of time after the reception of the demand.

9. A radio communication device, comprising:
a positioning member configured to determine a position of the radio communication device;
an antenna;
a receiver connected to the antenna; and
a controller connected to the receiver and the positioning member, configured to receive a demand for the position by way of the antenna and the receiver while running a voice call or data call application, and configured to stop the voice call or data call application and to have the positioning member determine the position in a case where a rank given to the demand is higher than a rank given to the voice call or data call application;
wherein the radio communication device is adapted to receive a plurality of types of demands for the position of the radio communication device;
wherein the plurality of types of demands comprise a privacy-override-type demand which is given the highest rank, a no-verification-type demand which does not provide a user with an opportunity to reject the demand and which is given the second-highest rank, and a verification-type demand which provides the user with an opportunity to reject the demand; and
wherein a GSM data call application of the radio communication device is given a rank which is higher than the rank of the verification-type demand, and which is lower than the ranks of the privacy-override-type demand and the no-verification-type demand.

10. The radio communication device of claim 9, wherein the controller is further configured to continue the voice or data call application and to have the positioning member determine the position in a case where the rank of the demand equals the rank of the voice call or data call application.

11. The radio communication device of claim 9, wherein the controller is further configured to have the positioning member determine the position upon finishing the voice call application within a given period of time after the reception of the demand in a case where the rank of the demand is lower than the rank of the voice call or data call application.

12. The radio communication device of claim 9, wherein the controller is further configured to process the demand for the position of the radio communication device and the voice or data call application simultaneously if the voice or data call application is a UMTS voice or data call application.

13. The radio communications device of claim 9, wherein a GSM voice call application of the radio communication device is given a rank which is lower than the rank of the privacy-override-type demand.

14. The radio communication device of claim 13, wherein the rank of the GSM voice call application is higher than the ranks of the no-verification-type demand and the verification-type demand.

15. The radio communication device according to claim 9, further comprising:
a camera configured to take a series of images; and
a memory configured to store a video formed by the series of images.

16. The radio communication device of claim 15, further comprising a presentation member,
wherein the controller is further configured to, when the demand is received while the video is being recorded: (i) present the reception of the demand on the presentation member and have the positioning member determine the position in a case where the demand is the verification-type demand and it is determined that the recording of the video will be finished within a given period of time after the reception of the demand, and (ii) cancel the demand in a case where the demand is the verification-type demand and it is determined that the recording of the video will not be finished within a given period of time after the reception of the demand.

17. The radio communication device of claim 15, wherein the controller is further configured to, when the demand is received while the video is being recorded, simultaneously process the demand for the position of the radio communication device and record the video, when the demand is of the privacy-override-type or the no-verification-type.

18. The radio communication device of claim 15, wherein the plurality of types of demands further comprise a notification-type demand which notifies the user of the demand and does not provide the user with an opportunity to reject the demand; and
wherein the controller is configured to, when the demand is received while the video is being recorded, stop the video recording and process the demand for the position of the radio communications device, when the demand is of the notification-type.

19. A radio communication device, comprising:
a camera configured to take a series of images;
a memory configured to store a video formed by the series of images;
a positioning member configured to determine a position of the radio communication device;
an antenna;
a receiver connected to the antenna;
a presentation member; and
a controller connected to the memory, the positioning member and the receiver, configured to receive a demand for the position by way of the antenna and the receiver while recording the video on the memory, and configured to: (i) present the reception of the demand on the presentation member and have the positioning member determine the position in a case where a rank given to the demand is lower than a rank given to the video recording and it is determined that the recording of the video will be finished within a given period of time after the reception of the demand, and (ii) cancel the demand in a case where the rank of the demand is lower than the rank of the video recording and it is determined that the recording of the video will not be finished within a given period of time after the reception of the demand.

20. The radio communication device of claim 19, wherein the controller is further configured to continue recording the video and to have the positioning member determine the position in a case where the rank of the demand equals the rank of the video recording.

21. The radio communication device of claim 19, wherein the controller is further configured to stop recording the video and to have the positioning member determine the position in a case where the rank of the demand is higher than the rank of the video recording.

* * * * *